US009082299B2

(12) United States Patent
Kabrt et al.

(10) Patent No.: US 9,082,299 B2
(45) Date of Patent: Jul. 14, 2015

(54) METHODS AND SYSTEMS FOR TAXIWAY TRAFFIC ALERTING

(75) Inventors: Tomas Kabrt, Prague (CZ); Tomas Marczi, Beroun (CZ); J. Howard Glover, Redmond, WA (US); Matej Dusik, Brno (CZ)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 171 days.

(21) Appl. No.: 13/533,394

(22) Filed: Jun. 26, 2012

(65) Prior Publication Data
US 2013/0345906 A1 Dec. 26, 2013

(51) Int. Cl.
*G08G 5/00* (2006.01)
*G08G 5/04* (2006.01)
*G08G 5/06* (2006.01)
(Continued)

(52) U.S. Cl.
CPC .............. *G08G 5/0008* (2013.01); *B60Q 9/008* (2013.01); *G08G 5/0021* (2013.01); *G08G 5/065* (2013.01); *B64F 1/002* (2013.01); *G05D 1/0083* (2013.01); *G08G 1/16* (2013.01); *G08G 5/0078* (2013.01); *G08G 5/045* (2013.01)

(58) Field of Classification Search
CPC ........... G01S 2013/916; G08G 5/0043; G08G 5/0078; G08G 5/0021; G08G 5/065; G08G 1/16; G08G 5/04; B60Q 9/008; G05D 1/0083; B64F 1/002
USPC .............................. 701/3, 117, 120, 121, 301
See application file for complete search history.

(56) References Cited

U.S. PATENT DOCUMENTS

| 2,686,426 A | * | 8/1954 | Kolisch ......................... 701/124 |
| 3,903,501 A | * | 9/1975 | Greenlee et al. ............. 340/982 |

(Continued)

FOREIGN PATENT DOCUMENTS

| EP | 1995708 A1 | 11/2008 |
| EP | 2328134 A1 | 6/2011 |
| GB | 875799 A * | 8/1961 |

OTHER PUBLICATIONS

RTCA List of Available Documents, Jun. 2014, RTCA, Inc, DO-322, Safety, Performance and Interoperability Requirements Document for ATSA-SURF Application, Issued Dec. 8, 2010, pp. 1, 3 and 33.*

(Continued)

*Primary Examiner* — Tuan C. To
*Assistant Examiner* — Dale W Hilgendorf
(74) *Attorney, Agent, or Firm* — Ingrassia Fisher & Lorenz, P.C.

(57) ABSTRACT

Systems and methods for providing the crew of a vehicle with a potential collision alert. The alert is based on presumed flight-crew action and reaction times, ownship speed, and required distance to safely stop the ownship before intersection with traffic. An exemplary system located aboard an ownship includes a communication device that receives information from a ground traffic; a memory device that stores ownship information and predefined constants; and a processing device that determines a distance to the traffic when the traffic passes the ownship after the ownship stops at a estimated full-stop location, based on the received ownship information and the predefined constants, determines distance to the ground traffic vehicle, based on the determined point in time, and generates a potential collision alert if the determined distance is less than a predefined safe distance value. An exterior lighting device outputs a visual illumination after the potential collision alert is generated.

19 Claims, 5 Drawing Sheets

(51) Int. Cl.
  *G05D 1/00*   (2006.01)
  *G08G 1/16*   (2006.01)
  *B60Q 9/00*   (2006.01)
  *B64F 1/00*   (2006.01)

(56) References Cited

U.S. PATENT DOCUMENTS

| | | | | |
|---|---|---|---|---|
| 4,118,688 | A | * | 10/1978 | Glennon ........................ 340/516 |
| 5,018,689 | A | * | 5/1991 | Yasunobu et al. .............. 701/20 |
| 5,978,715 | A | * | 11/1999 | Briffe et al. ..................... 701/11 |
| 6,252,525 | B1 | * | 6/2001 | Philiben ........................ 701/301 |
| 6,456,205 | B1 | * | 9/2002 | Russell et al. ........... 340/815.45 |
| 2005/0007257 | A1 | * | 1/2005 | Rast ........................ 340/815.45 |
| 2006/0007021 | A1 | * | 1/2006 | Konya et al. .................. 701/301 |
| 2006/0066470 | A1 | * | 3/2006 | Anderson et al. ............... 342/29 |
| 2007/0040696 | A1 | * | 2/2007 | Mubaslat et al. ............. 340/657 |
| 2008/0306691 | A1 | * | 12/2008 | Louis et al. ................... 701/301 |
| 2009/0164122 | A1 | * | 6/2009 | Morbey et al. ................ 701/301 |
| 2011/0084823 | A1 | | 4/2011 | McCarthy |
| 2013/0297102 | A1 | * | 11/2013 | Hughes et al. .................... 701/3 |

OTHER PUBLICATIONS

EP Examination Report for Application No. 13 171 573.2 dated Nov. 12, 2013.

EP Search Report for Application No. 13 171 573.2 dated Oct. 24, 2013.

EP Examination Report for Application No. 13 171 573.2 dated Oct. 24, 2014.

* cited by examiner

FIG.5 ent invention are described in detail below with reference to the following drawings:

METHODS AND SYSTEMS FOR TAXIWAY TRAFFIC ALERTING

BACKGROUND OF THE INVENTION

There exists a significant problem with potential collisions between aircraft (or ground vehicles) and other aircraft (or ground vehicles) during operations on the surface of the airport, particularly at night or in low-visibility conditions.

Current collision-avoidance systems, such as traffic collision avoidance systems (TCAS) are effective only when aircraft are airborne. Also, relatively few large airports are equipped with radar that can monitor surface traffic, and even where it is available this radar usually has many "blind spots" on the airport where detection of airplanes or vehicles is not possible.

SUMMARY OF THE INVENTION

The present invention includes systems and methods for providing the crew of an airplane or vehicle with an alert of an impending collision.

The time when the alert is triggered depends on presumed flight-crew action and reaction times, ownship speed, and required distance to safely stop the ownship before intersection with traffic. Moreover, the present invention does not use airport map data.

An exemplary system located aboard an ownship includes a communication device that receives information from a ground traffic vehicle; a memory device that stores ownship information and predefined constants; and a processing device that determines a point in time associated with a full-stop location of the ownship, based on the received ownship information and the predefined constants, determines distance to the ground traffic vehicle based on the determined point in time, and generates a potential collision alert if the determined distance is less than a predefined safe distance value. An output device outputs the generated potential collision alert.

BRIEF DESCRIPTION OF THE DRAWINGS

Preferred and alternative embodiments of the present invention are described in detail below with reference to the following drawings.

DETAILED DESCRIPTION OF THE INVENTION

The present invention identifies potential collision with traffic in sufficient time to allow the crew to take corrective action. The present invention also ensures that nuisance alerts or lost alerts are minimized. The present invention does not rely on the availability of map data for the airport.

Figure 1:
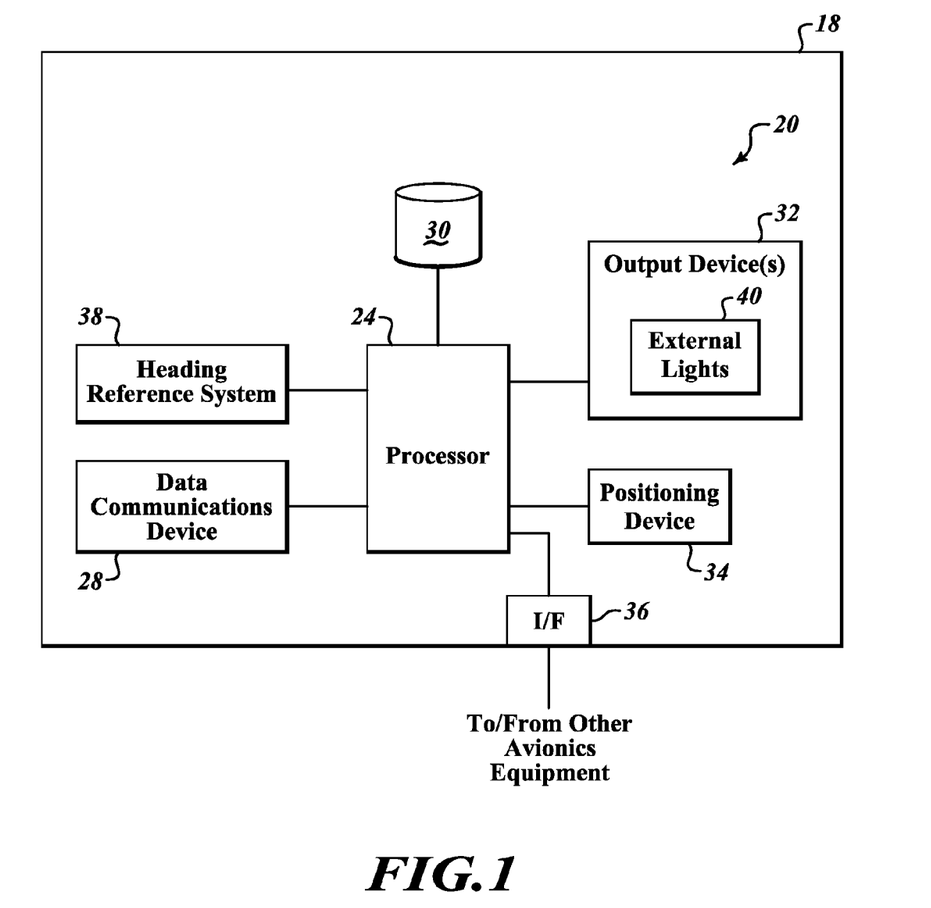
FIG. 1 is a block diagram of an exemplary system formed in accordance with an embodiment of the present invention.

FIG. 1 shows an exemplary system 20 located on an ownship (e.g., aircraft, airport ground vehicle) 18 for providing a crew of the ownship ample early warning of a potential ground operations collision. The system 20 includes a processor 24 that is in signal communication with a data communication device 28, memory 30 (i.e., database), an output device 32, a navigation/position device 34 (e.g., GPS, INS, etc.) and an interface (IF) device 36.

The processor 24 receives the following data from existing avionic systems on the ownship 18:
 Geographic Position (latitude and longitude from the positioning device 34);
 Heading (from the heading reference system 38 (e.g., gyro, compass, inertial navigation system (INS));
 Speed (from the positioning device 34); and
 Wingspan information (from the memory 30).

The processor 24 receives the following data from other aircraft or vehicles (the "traffic"):
 Geographic Position (latitude and longitude);
 Heading;
 Speed; and
 Size Category.

An example of the data communications device 28 includes an automatic dependent surveillance-broadcast (ADS-B) data link system.

The processor 24 also receives from the memory 30, or some external source, some constant values, such as those previously defined in various publications (e.g., RTCA DO-322). Examples of constant values include:
 Flight crew reaction time $t_R$ (seconds)—time to alert notice and evaluation;
 Flight crew action time $t_A$ (seconds)—time of decision making and starting a braking action;
 Aircraft "standard" deceleration a (meters/second)—rate of deceleration while braking following an alert.

Using all or a portion of the received data, the processor 24 determines if a collision-alert condition exists. If a collision-alert condition is determined to exist, the processor 24 outputs an alert signal to the output device 32.

Figure 2:
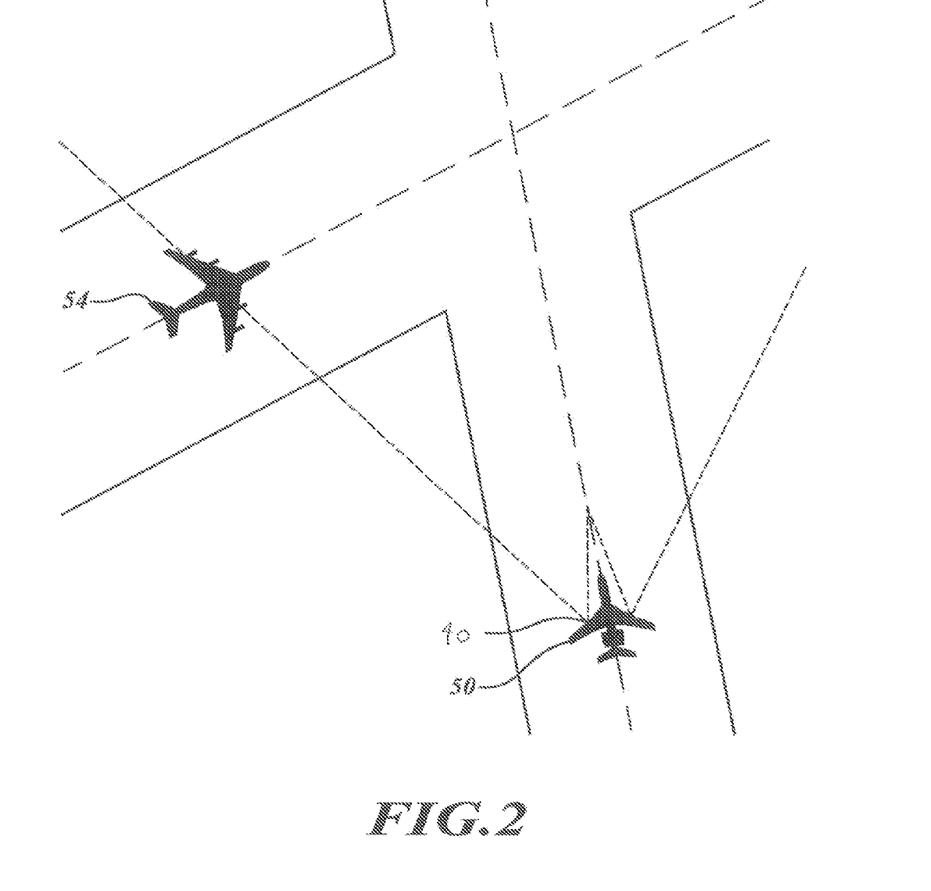
FIG. 2 is a perspective view of an aircraft illuminating another aircraft during a potential collision condition.

FIG. 2 shows a first taxiing aircraft 50 that has determined that a potential collision condition exists with a second taxiing aircraft 54. In response to the potential collision condition determination, the first taxiing aircraft 50 activates lights 40 (e.g., landing lights) that provide illumination in the direction of the second taxiing aircraft 54, thus alerting the second aircraft's flight crew of an alert condition.

Figure 3:
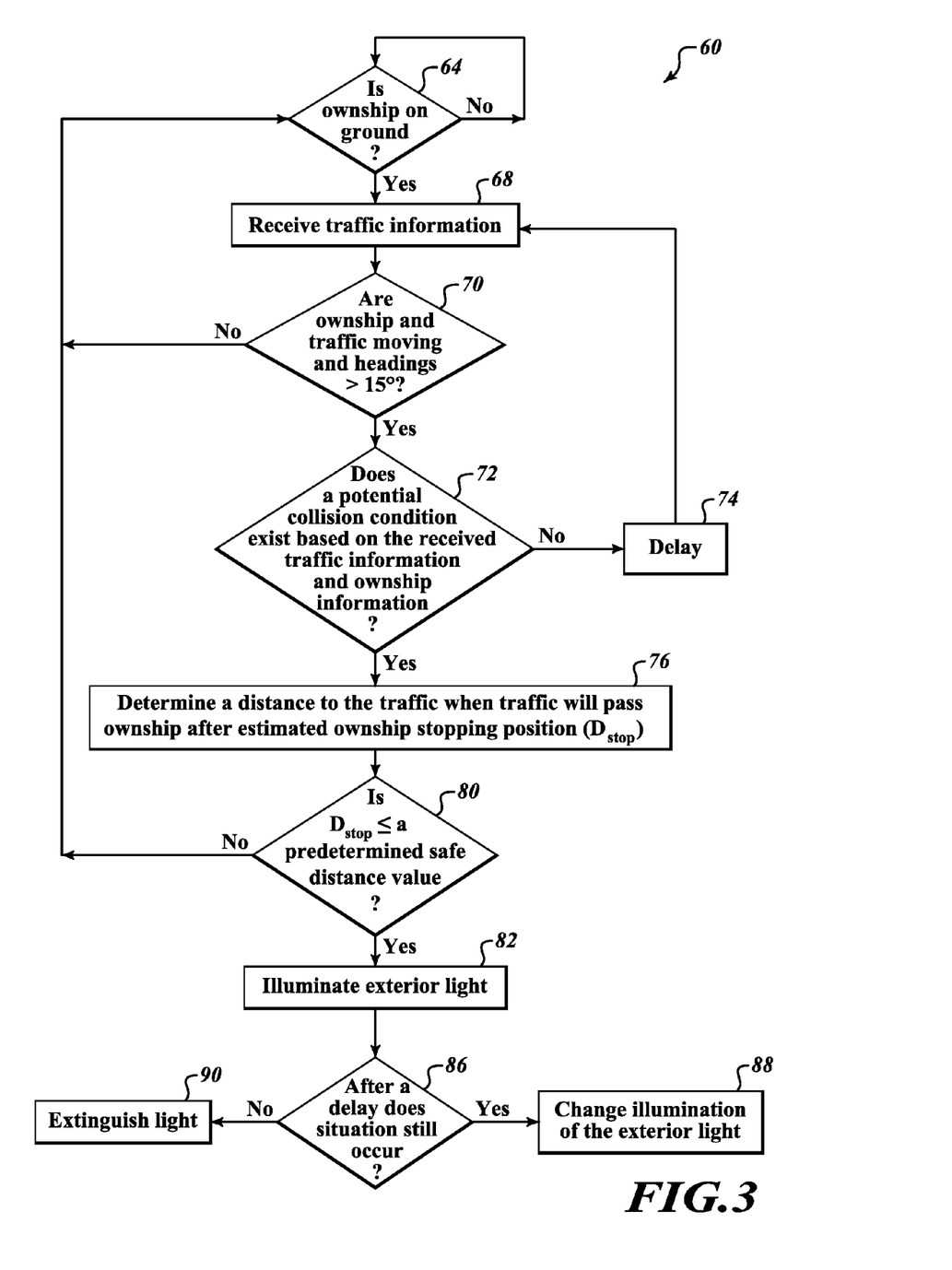
FIG. 3 is a flow diagram of an exemplary process performed by the present invention.

FIG. 3 shows a flow diagram of an exemplary process 60 performed by the system 20. First, at a decision block 64, the processor 24 determines if the ownship is on the ground. If the ownship is a ground vehicle, then this condition is always true. If the ownship is an aircraft, then the processor 24 determines this condition to be true, based on an on-ground indicator (e.g., weight-on-wheels signal) received from a databus via the IF device 36, ownship position and altitude information, airport/geographic information (i.e., altitude), or some other criteria.

After the ownship is determined to be on the ground, the processor 24 receives information from other proximate grounded vehicles at process 68. Then, the process 60 determines if the ownship is moving, see decision block 70. If the ownship is determined to be moving, the process 60 determines if a potential collision condition exists, based on the received target information and the ownship information, see decision block 72. If the potential collision condition does not exist, then the process 60 returns to decision block 64 after a delay (block 74). If the potential collision condition exists, then, at a block 76, a distance to the traffic, when the traffic will pass the ownship after an estimated ownship stopping position, is determined.

Next, at a decision block 80, it is determined if the determined distance to the traffic is less than or equal to a predetermined safe-distance value. If the distance to traffic is not less than or equal to the predetermined safe-distance value, then the process 60 returns to decision block 64. If the distance to traffic is less than or equal to the predetermined safe-distance value, then, at a block 82, a potential collision alert condition exists and warning of the traffic is performed by illuminating an exterior light 40 of the ownship. The illuminated exterior light of the ownship provides a warning to the flight crew of the traffic that a collision threat exists. At a decision block 86, after a delay the process 60 determines if the potential collision alert condition still exists. If the potential collision alert condition still exists, then at a block 88, the illumination of the exterior light(s) is changed (e.g., steady to flashing; slow flashing to fast flashing). If the potential collision alert condition is determined to not exist after the delay, then at a block 90, the exterior light(s) is extinguished.

The exterior light is one designated exclusively for this purpose or is an existing light(s) of the ownship (e.g. landing lights).

In one embodiment, the first time the exterior light(s) is illuminated, it is illuminated in a predefined pattern. An example of the predefined pattern includes steady on at various levels of intensity. Another example of the predefined pattern includes flashing at a first rate.

When the exterior light(s) illumination is changed, various aspects of the illuminating exterior light(s) are changed either separately or in combination. For example, the light intensity changes, the rate of flashing changes or if there are more than one landing light, then the lights alternately flash. If the potential collision alert condition still existed after the delay without adequate resolution, it would be assumed that a collision is more imminent. In this situation, the exterior light illumination is changed in order to impart a more immediate need to take action. Increasing the flash rate or intensity of the exterior light(s) are exemplary ways of imparting a need to take action.

In one embodiment, the outputted alerts include graphical highlighting of areas or traffic on a cockpit map display, are text messages presented on a display, or are aural messages provided to the crew via cockpit loudspeaker or headset. Tactile alert systems may also be used.

The solution of the potential traffic collision detection is built on the following conditions:
Ownship is aware about the traffic position (e.g., from traffic ADS-B data or another source);
Ownship is aware about the traffic heading (e.g., from traffic ADS-B data or another source);
Ownship is aware about the traffic speed (e.g., from traffic ADS-B data or another source); and
Ownship is aware about the traffic size category (e.g., from traffic ADS-B data or another source).

Wingspan of the traffic is determined according to information about the size category of the traffic aircraft, e.g., from the traffic ADS-B data and a database stored in the memory 30. For each size category, the processor 24 uses the higher value of wingspan range stored in the memory 30.

The processor 24 uses the following constants when determining the full-stop location: flight crew reaction time ($t_R$ (sec)); flight crew action time ($t_A$ (sec)); and aircraft deceleration (a('s$^2$)).

Based on speed of the ownship (OS) the braking distance ($d_{Brake}$) and time to full stop ($T_{STOP}$) are calculated from following formulas:

$$t_S = \frac{v_{OS}}{|a|} \quad (1)$$

$$T_{STOP} = t_R + t_A + t_S \quad (2)$$

$$d_{Brake} = v_{OS} \cdot T_{STOP} + \frac{1}{2} a \cdot t_S^2 \quad (3)$$

where ($t_s$) is time of ownship deceleration to full stop from ($v_{OS}$) (actual speed of ownship) without consideration of crew reaction or action time.

Equation (3) represents the assumption that, after alert triggering, the speed of ownship remains constant during the time period ($t_R+t_A$) and after this time ownship starts deceleration with deceleration rate (a) (ownship decelerates until $v_{OS}=0$).

The processor 24 calculates "safe distance". $D_{Safe}$, which represents minimum distance between ownship and traffic (TR), in which ownship and traffic shall pass each other.
Where: $C_{Safe}$—Safety coefficient;
$W_{Span\_TR}$—wingspan of the traffic;
$W_{Span\_OS}$—wingspan of the ownship;
(retrieved from ownship parameters database (the memory 30)).

$$D_{Safe} = C_{Safe} \cdot \frac{W_{Span\_OS} + W_{Span\_TR}}{2} \quad (4)$$

Figure 4:
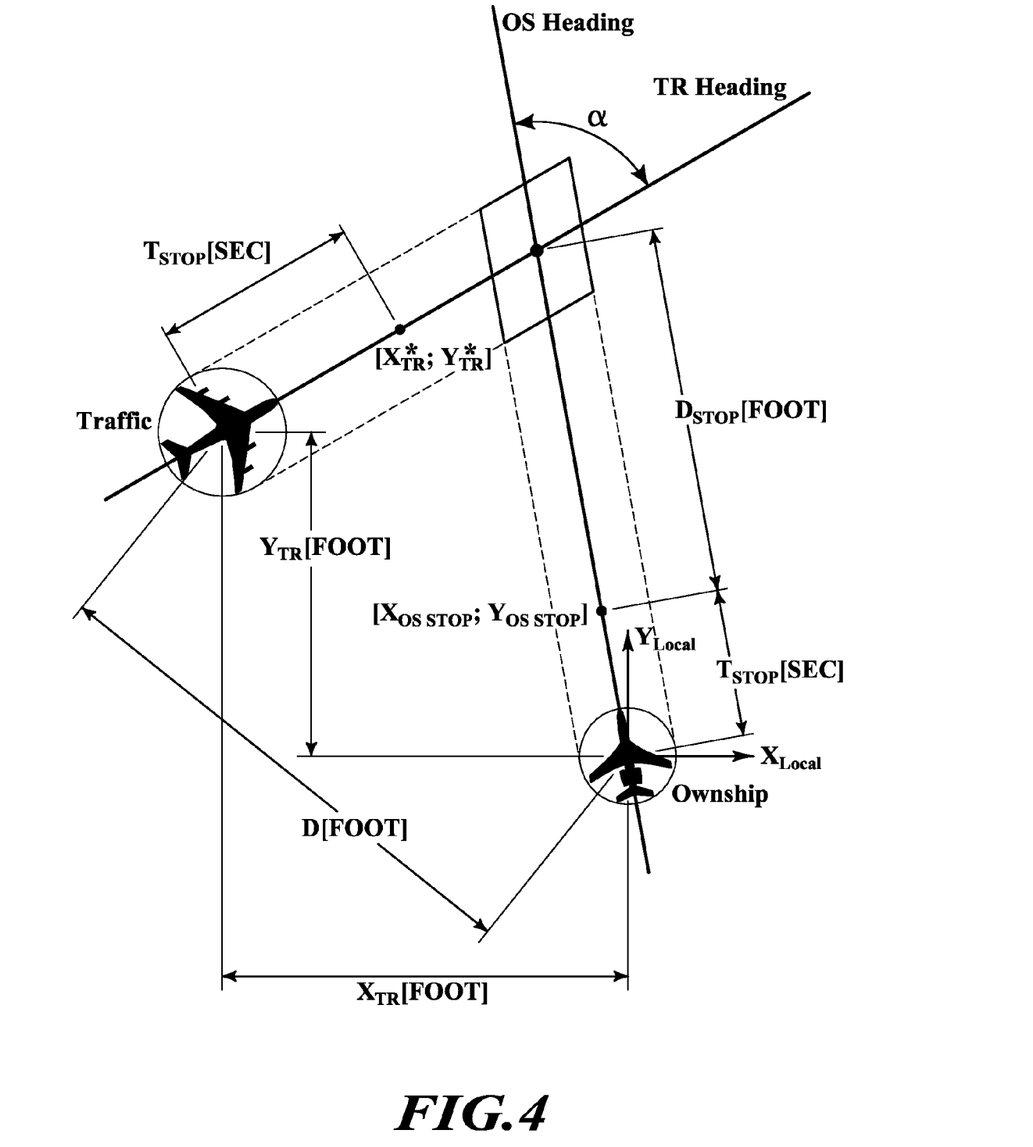
FIG. 4 is a top-down view of two aircraft taxiing on crossing trajectories.

The processor 24 recalculates the position of traffic ($X_{TR}$; $Y_{TR}$) to a "local" coordinate system relative to the position of ownship (FIG. 4).
GPS position of ownship: ($X_{OS\ GPS}$; $Y_{OS\ GPS}$)
$X_{OS\ GPS}$=OS Longitude
$Y_{OS\ GPS}$=OS Latitude
GPS position of Traffic: ($X_{TR\ GPS}$; $Y_{TR\ GPS}$)
$X_{TR\ GPS}$=TR Longitude
$Y_{TR\ GPS}$=$T_R$ Latitude
Current position of ownship and traffic in the local coordinate system (expressed in feet) is as follows:
OS position ($X_{OS}$; $Y_{OS}$): (0; 0)
TR position [$X_{TR}$; $Y_{TR}$]: ($X_{TR\ GPS}-X_{OS\ GPS}$; $Y_{TR\ GPS}-Y_{OS\ GPS}$)

The processor 24 evaluates whether the traffic represents a potential threat to ownship. Evaluation is based the following values:
actual value of traffic heading;
actual value of traffic speed;
actual value of ownship heading; and
actual value of ownship speed.

The current distance between ownship and traffic is expressed as follows:

$$D_{Curr} = \sqrt{(X_{TR}-X_{OS})^2 + (Y_{TR}-Y_{OS})^2} \quad (5)$$

Calculation is running in the local coordinate system $X_{OS}=Y_{OS}=0$; thus, equation (5) is rewritten as:

$$D_{Curr} = \sqrt{(X_{TR}^2 + Y_{TR}^2)} \quad (6)$$

The distance between ownship and traffic is written as a function of time. In the local coordinate system the position of ownship and traffic in time (t) is written as follows:

$$X_{OS(t)} = X_{OS} + v_{OS} \cdot t \cdot \cos \gamma_{OS} = v_{OS} \cdot t \cdot \cos \gamma_{OS}$$

$$Y_{OS(t)} = Y_{OS} + v_{OS} \cdot t \cdot \cos \gamma_{OS} = v_{OS} \cdot t \cdot \sin \gamma_{OS} \quad (7)$$

$$X_{TR(t)} = X_{TR} + v_{TR} \cdot t \cdot \cos \gamma_{TR}$$

$$Y_{TR(t)} = Y_{TR} + v_{TR} \cdot t \cdot \sin \gamma_{TR} \quad (8)$$

Where:
$\gamma_{OS}$=90−Ownship heading
$\gamma_{TR}$=90−Traffic heading
(OS and TR represent the angle of ownship and traffic heading measured in local coordinate system).

Function of distance between the ownship and traffic is expressed as follows:

$$D_{(t)} = \sqrt{(X_{TR_{(t)}} - X_{OS_{(t)}})^2 + (Y_{TR_{(t)}} - Y_{OS_{(t)}})^2} \quad (9)$$

$$D_{(t)} = \sqrt{\begin{array}{l}(X_{TR} + v_{TR} \cdot t \cdot \cos\gamma_{TR} - v_{OS} \cdot t \cdot \cos\gamma_{OS})^2 + \\ (Y_{TR} + v_{TR} \cdot t \cdot \sin\gamma_{TR} - v_{OS} \cdot t \cdot \sin\gamma_{OS})^2\end{array}}$$

Figure 5:
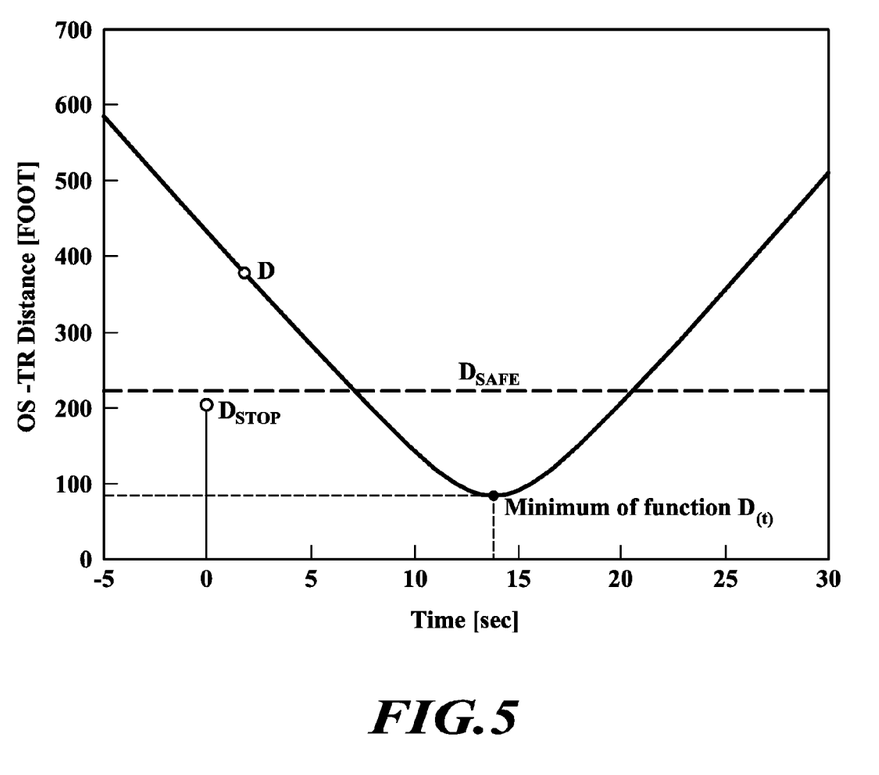
FIG. 5 is a graph of the situation shown in FIG. 4.

Development of the equation (9) results in following:

$$D_{(t)} = \sqrt{A \cdot t^2 + B \cdot t + C} \quad (10)$$

where:
$A = v_{TR}^2 - 2 \cdot (v_{TR} \cos\gamma_{TR} \cdot v_{OS} \cos\gamma_{OS} + v_{TR} \sin\gamma_{TR} \cdot v_{OS} \sin\gamma_{OS}) + v_{OS}^2$
$B = 2 \cdot [X_{TR} \cdot (v_{TR} \cos\gamma_{TR} - v_{OS} \cos\gamma_{OS}) - Y_{TR} \cdot (v_{TR} \sin\gamma_{TR} - v_{OS} \sin\gamma_{OS})]$
$C = X_{TR}^2 + Y_{TR}^2$ Equation (10) indicates parabolic running of function $D_{(t)}$. As an example, FIG. 5 shows running of the function $D_{(t)}$ in the interval t[−5, 30]. In this example, $D_{(t)}$ is depicted under the following conditions:

Ownship heading: 50°
Ownship speed: 30 knots
Traffic coordinates (foot): [755.6; −101.99]
Traffic heading: 340°
Traffic speed: 30 knots From FIG. 5 it is seen that, in a certain time, ownship and traffic will be at a minimum distance from each other ($D_{(t)}$ reaches its minimum). Minimum of $D_{(t)}$ shows in distance and time when ownship and traffic will pass each other if both airplanes maintain constant actual speed and heading. If the traffic is about to collide with ownship, the minimum of $D_{(t)}$ will be less than "safe distance" ($D_{Safe}$).

If first derivative of function $D_{(t)}$ is equal to zero, the time in which the distance between ownship and traffic will be minimum can be calculated.

To simplify the solution equation (10) is expressed as follows:

$$D_{(t)}^2 = A \cdot t^2 + B \cdot t + C \quad (11)$$

The first derivation of equation (11):

$$(D_{(t)}^2)' = 2At + B (D_{(t)}^2)' = 2At + B \quad (12)$$

The time of minimum of $D_{(t)}$ is found if:

$$(D_{(t)}^2)' = 0 \Rightarrow 2At_{Min} + B = 0$$

Hence $$t_{Min} = -\frac{B}{2A} \quad (13)$$

Substituting $t_{Min}$ to the equation (10) the minimum value of $D_{(t)}$ is obtained. The minimum value of $D_{(t)}$ is the distance in which ownship and traffic pass each other (or "collide").

$$D_{Min} = \sqrt{A \cdot t_{Min}^2 + B \cdot t_{Min} + C} \quad (14)$$

If $D_{Min}$ is less than $D_{Safe}$, the traffic may represent a potential future threat. Then, the processor 24 calculates the distance in which traffic will pass ownship after ownship stops ($D_{Stop}$), if an alert is triggered at the current time. Calculation is done in the local coordinate system ($X_{OS} = Y_{OS} = 0$). Using equation (3) the position of ownship in time is written as follows:

$$X_{OS\,STOP} = d_{Brake} \cdot \cos(\gamma_{OS})$$

$$Y_{OS\,STOP} = d_{Brake} \cdot \sin(\gamma_{OS}) \quad (15)$$

In the same time, under the assumption of constant speed and heading of traffic, the traffic is determined to be at the following position:

$$X^*_{TR} = X_{TR} + v_{TR} \cdot T_{STOP} \cdot \cos(\gamma_{TR})$$

$$Y^*_{TR} = Y_{TR} + v_{TR} \cdot T_{STOP} \cdot \sin(\gamma_{TR}) \quad (16)$$

For the condition above, the distance by which traffic is predicted to pass the ownship can be obtained from equation (9). For this case equation (10) is expressed as follows and distance by which traffic will pass the stationary ownship is calculated:

$$D^*_{(t)} = \sqrt{(X^*_{TR} + v_{TR} \cdot t \cdot \cos\gamma_{TR})^2 + (Y^*_{TR} + v_{TR} \cdot t \cdot \sin\gamma_{TR})^2}$$

$$D^*_{(t)} = \sqrt{A^* \cdot t^2 + B^* \cdot t + C^*}$$

$$D^*_{(t)}{}^2 = A^* \cdot t^2 + B^* \cdot t + C^* \quad (17)$$

Where:
$A^* = v_{TR}^2$
$B^* = 2 \cdot v_{TR} \cdot (X^*_{TR} \cos\gamma_{TR} - Y^*_{TR} \sin\gamma_{TR})$
$C^* = X^{*2}_{TR} + Y^{*2}_{TR}$ Hence:

$$t^*_{Min} = -\frac{B^*}{2A^*} \quad (18)$$

$$D_{Stop} = \sqrt{A^* \cdot t^{*2}_{Min} + B^* \cdot t^*_{Min} + C^*} \quad (19)$$

$D_{Stop}$ represents the expected distance by which traffic will pass the ownship if alert is triggered at present time and ownship is stopped under the assumption of equation (3). If the value of $D_{Stop}$ is greater than the "safe distance" value (equation (4)), traffic is evaluated as "safe". If the value of $D_{Stop}$ is less than the "safe distance" value (equation (4)), traffic is evaluated as a threat and an alert is triggered.

In one embodiment, the processor 24 continuously evaluates the distance between ownship and traffic and the predicted separation distance $D_{Stop}$ between ownship and traffic if ownship stops. If this distance is equal to or less than the safe distance, the alert is triggered.

FIG. 4 shows an example of two aircraft on crossing taxiways.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method performed by a system located on an ownship, the method comprising:

at a processing device,
  determining whether the ownship is on the ground based upon a weight-on-wheels signal;
  determining, in response to determining that the ownship is on the ground, whether the ownship is in motion;
  receiving, in response to determining that the ownship is in motion, information from a ground traffic vehicle;
  receiving, in response to determining that the ownship is in motion, ownship information;
  determining a distance by which the ground traffic vehicle will pass the ownship after reaching an estimated full-stop location of the ownship based on the received ownship information and one or more predefined constants, the predefined constants comprising a flight crew reaction time and a flight crew action time;
  generating a potential collision alert if the determined distance is less than a predefined safe distance value, the safe distance value calculated based upon a wingspan of the ownship and a wingspan of the ground traffic vehicle; and
  at an exterior lighting device, providing illumination towards the ground traffic vehicle after generation of the potential collision alert.

2. The method of claim 1, wherein the safe distance value, $D_{safe}$, is calculated based upon the equation:

$$D_{Safe} = C_{Safe} \cdot \frac{W_{Span\_OS} + W_{Span\_TR}}{2},$$

where $C_{safe}$ is a coefficient, $W_{Span\_OS}$ is the wingspan of the ownship, and $W_{Span\_TR}$ is the wingspan of the ground traffic vehicle.

3. The method of claim 2, wherein the predefined safe distance value is based on the wingspan information of the ownship and the ground traffic vehicle, wherein the one or more predefined constants comprises a crew reaction time constant, a crew action time constant and an ownship rate of deceleration value.

4. The method of claim 1, at the processing device, determining that the potential collision alert continues to exist after a delay, and altering, in response to the determining that the potential collision alert continues to exist after the delay, the illumination provided by the exterior lighting device to indicate that a collision between the ownship and the ground based vehicle is imminent.

5. The method of claim 4, wherein altering comprises altering an intensity.

6. The method of claim 4, wherein altering comprises altering a flash rate.

7. The method of claim 1, wherein the exterior lighting device comprises two or more lights, wherein the illumination comprises altering illumination between two or more lights.

8. A system located aboard an ownship, the system comprising:
  a communication device configured to receive information from a ground traffic vehicle;
  a memory device configured to store ownship information and one or more predefined constants, the predefined constants comprising a flight crew reaction time and a flight crew action time;
  a processing device in signal communication with the communication device and the memory device, the processing device configured to;
    determine whether the ownship is on the ground based upon a weight-on-wheels signal;
    determine, in response to determining that the ownship is on the ground, whether the ownship is in motion;
    determine, in response to determining that the ownship is in motion, a distance by which the ground traffic vehicle will pass the ownship at an estimated full-stop location of the ownship based on the received ownship information and one or more predefined constants;
    generate a potential collision alert if the determined distance is less than a predefined safe distance value, the safe distance value calculated based upon a wingspan of the ownship and a wingspan of the ground traffic vehicle; and
  an exterior lighting device configured to provide illumination towards the ground traffic vehicle after generation of the potential collision alert.

9. The system of claim 8, wherein the received information from the ground traffic vehicle comprises speed, heading, location, and size information for the ground traffic vehicle, wherein the memory device comprises wingspan information for the ownship and the various sized vehicles, wherein the processor retrieves wingspan information for the ground traffic vehicle from the memory device based on the size information.

10. The system of claim 9, wherein the predefined safe distance value is based on the wingspan information of the ownship and of the ground traffic vehicle.

11. The system of claim 9, wherein the processing device is further configured to: determine a minimum distance between the ownship and the ground traffic vehicle based on current speed and heading information for both vehicles; determine if a potential collision condition exists based on the determined minimum distance; and suspend generation of the potential collision alert operation if the potential collision condition is not determined to exist.

12. The system of claim 8, wherein the one or more predefined constants comprises a crew reaction time constant, a crew action time constant and an ownship rate of deceleration value.

13. The system of claim 8, wherein the processing device alters the illumination provided by the exterior lighting device.

14. The system of claim 13, wherein the processing device alters an intensity.

15. The system of claim 13, wherein the processing device alters a flash rate.

16. The system of claim 8, wherein the exterior lighting device comprises two or more lights, wherein the illumination comprises altering illumination between two or more lights.

17. The system of claim 8, wherein the exterior lighting device comprises at least one landing light.

18. A system located on an ownship, the system comprising:
  a means for determining whether the ownship is on the ground, the means generating a weight-on-wheels signal;
  a means for determining, in response to determining that the ownship is on the ground, whether the ownship is in motion;
  a means for receiving information, in response to determining that the ownship is on motion, from a ground traffic vehicle;

a means for receiving ownship information;

a means for determining a distance by which the ground traffic vehicle will pass the ownship at an estimated full-stop location of the ownship based on the received ownship information and one or more predefined constants, the predefined constants comprising a flight crew reaction time and a flight crew action time;

a means for generating a potential collision alert if the determined distance is less than a predefined safe distance value, the safe distance value calculated based upon a wingspan of the ownship and a wingspan of the ground traffic vehicle; and a means for directing a visual illumination toward the ground traffic vehicle after generation of the potential collision alert.

19. The system of claim 18, further comprising:

a means for determining a minimum distance between the ownship and the ground traffic vehicle based on current speed and heading information for both vehicles;

a means for determining if a potential collision condition exists based on the determined minimum distance; and a means for suspending operation of the means for generating the potential collision alert, if the potential collision condition is not determined to exist.

* * * * *